*J. P. Wile,*
*Harrow.*
No. 90,713.  Patented June 1, 1869.
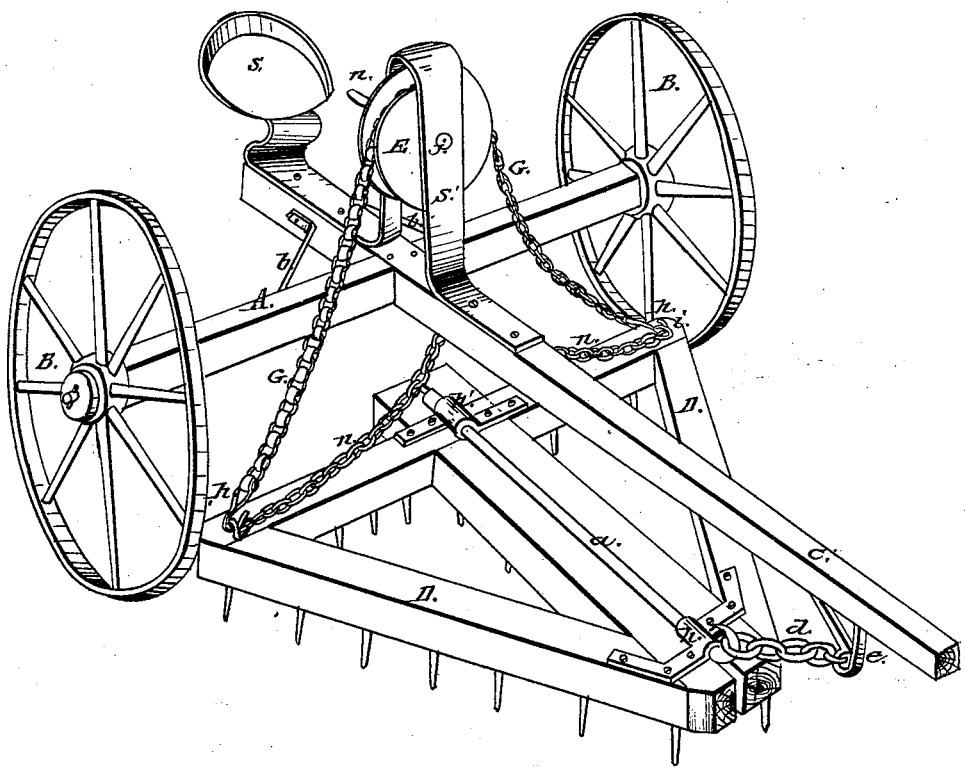
Witnesses:
C. J. Cook
Otto L. Johnson
Inventor:
Jacob Peter Wile

United States Patent Office.

JACOB P. WILE, OF NASHVILLE, MICHIGAN.

Letters Patent No. 90,713, dated June 1, 1869.

---

IMPROVEMENT IN HARROWS.

---

The Schedule referred to in these Letters Patent and making part of the same.

---

*To all whom it may concern:*

Be it known that I, JACOB P. WILE, of Nashville, in the county of Barry, and State of Michigan, have invented certain new and useful Improvements in Harrows; and I do hereby declare that the following is a full, clear, and exact description of the same, and of the mode of operation, reference being had to the annexed drawings, making a part of this specification, and giving a perspective view thereof.

My invention relates to that class of harrows which is connected with a two-wheeled carriage, on which the driver is seated, and consists of an improved construction and arrangement of the several parts, with a view to simplicity, equilibrium, draught, adjustment, facility of detachment from the carriage, and adaptation for independent use whenever necessary.

The carriage to my improved harrow consists simply of a wooden axle-tree A, carrying a pair of traction-wheels, B B, and of a long tongue, or pole, C, which is extended or prolonged over the harrow, and across and behind the axle-tree sufficiently far to receive a spring-seat, S, for the driver, so as to about balance the overhang in front.

I usually lap and bolt the pole-extension and axle-tree together, and secure and stiffen them still further by a pair of angle-braces, *b b*.

The harrow itself consists of two triangular frame-sections D D, the several bars of which are furnished with the ordinary teeth.

I hinge the two sections together by a hinge, *h'*, at each end of the inner bars, the straps of said hinges extending over the outer bars, as seen, to serve as tie-plates to connect the angles of the harrow-frames more firmly together.

A rod, *a*, bent hook-fashion at the front end, to connect with the draught-chain *d*, and nutted, or fitted with key, or check-pin behind the back hinge, does duty as hinge-pivot and draw-bar.

For the purpose of using a short draught-chain, and yet approximate to the true line of draught, I usually employ a long bracing-staple, *e*, under the pole, to which I hook the chain *d ;* and I secure the hind end of the harrow from lateral swaying by means of a stay-chain, *n*, on each side, hooking into a staple, *i*, near the corner of the harrow-frames.

The chains *n* should be sufficiently slack to permit a free bearing of the harrow on uneven ground, and yet prevent contact with the traction-wheels.

E represents a grooved pulley carrying a crank-shaft, *j*, which I hang to standards S', secured on top of the pole, in front of the driver, and immediately over the hinder side of the harrow and stay-chains aforesaid.

The pulley E is provided around its periphery with pins, (not seen,) to gear with the links of a slack gear-chain, G, passing over it, the ends of said chain being furnished with hooks *h*, which are hooked into the same staples as are the stay-chains heretofore described.

The hinged sections of the harrow accommodate themselves to all inequalities of the ground, and as they are placed in front of the driver, and under his eye, he is enabled to manipulate them with great ease and success by the aid of the geared chain and pulley G and E.

Should the teeth-spaces become choked by sod, or other obstruction, the driver seizes the winch-handle, and by turning it in the proper direction, revolves the pulley gearing with the chain hooked to the choked section, and tilts it up, which enables it to clear itself; or the obstruction may be removed by hand, or otherwise, without dismounting.

The same manipulation in tilting up the sections, enables the driver to steer clear of any obstacle in the harrow's path, as may be readily understood without further explanation.

The harrow is suspended above the ground, and is secured in such position while going to or returning from its place of work, in the following manner:

The operator first tilts up one of the harrow-sections, as heretofore described, then unhooking the chain G from the section on the ground, he tilts up that by hand, and secures the two sections together by means of the free portion of said chain, a short hitch being taken, first or last, with the draught-chain *d*.

In harrowing over stumpy or stony ground, where the use of a carriage is inadmissible, the harrow may be readily detached by merely unhooking the chains, and used alone, in the common way, by hitching to the hooked end of the pivot-rod *a*.

I do not claim hinging the sections of a harrow, nor combining therewith a wheel-carriage; but having described my invention,

What I claim as new, and desire to secure by Letters Patent, is as follows:

1. I claim the arrangement of the extension-pole C and attached seat S with the carriage-axle and wheels A B, and hinged harrow-sections D D, constructed, connected, and operated, substantially as and for the purpose specified.

2. I claim, in combination with a wheel-carriage and hinged sectional harrow, the pulley E, crank *n*, and chain G, when said pulley and crank are elevated in front of the driver's seat, and the chain hooked to the harrow-sections, substantially as and for the uses set forth.

JACOB P. WILE.

Witnesses:
L. E. STAUFFER,
J. M. ROE.